United States Patent
Liang et al.

(10) Patent No.: US 8,344,753 B1
(45) Date of Patent: Jan. 1, 2013

(54) TERMINAL RESISTOR APPARATUS

(75) Inventors: Jen-Te Liang, Taoyuan County (TW); Chih-Hung Tsai, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 0 days.

(21) Appl. No.: 13/231,307

(22) Filed: Sep. 13, 2011

(30) Foreign Application Priority Data

Jun. 15, 2011 (TW) .............................. 100120869 A

(51) Int. Cl.
*H03K 17/16* (2006.01)
(52) U.S. Cl. .......................................... 326/30; 326/27
(58) Field of Classification Search ................ 326/21, 326/26, 27, 30, 82, 115
See application file for complete search history.

(56) References Cited

U.S. PATENT DOCUMENTS

| | | | |
|---|---|---|---|
| 5,374,861 A * | 12/1994 | Kubista | 326/30 |
| 6,639,423 B2 * | 10/2003 | Martin et al. | 326/30 |
| 6,924,660 B2 * | 8/2005 | Nguyen et al. | 326/30 |
| 7,538,589 B2 * | 5/2009 | Butler | 327/108 |
| 2003/0218477 A1 * | 11/2003 | Jang et al. | 326/30 |
| 2006/0238218 A1 * | 10/2006 | Ritchie et al. | 326/30 |

\* cited by examiner

*Primary Examiner* — Don Le
(74) *Attorney, Agent, or Firm* — Muncy, Geissler, Olds & Lowe, PLLC

(57) ABSTRACT

A terminal resistor apparatus includes an input-side switch, an input-side terminal resistor, an output-side switch, and an output-side terminal resistor. When a plurality of the terminal resistor apparatus are connected, the input-side switch of the first terminal resistor apparatus will be conducted so that the input-side terminal resistor will be connected, but the output-side switch will not be conducted so that the output-side terminal resistor will not be connected. The input-side switch of the last terminal resistor apparatus will not be conducted so that the input-side terminal resistor will not be connected, but the output-side switch will be conducted so that the output-side terminal resistor will be connected. The input-side switches of the other terminal resistor apparatus will not be conducted so that the input-side terminal resistors will not be connected, and the output-side switches will not be conducted so that the output-side terminal resistors will not be connected.

12 Claims, 6 Drawing Sheets

TERMINAL RESISTOR APPARATUS

BACKGROUND OF THE INVENTION

1. Field of the Invention

The present invention relates to a resistor apparatus, and especially relates to a terminal resistor apparatus.

2. Description of Prior Art

RS485 is a conventional communication standard for industrial environment. Controller area network (CAN or CAN-bus) is a conventional communication standard for vehicles. When the RS485 or the controller area network is used, the first of the electronic apparatus in the network will need to be connected to a terminal resistor to decrease signal interference, and the last of the electronic apparatus in the network will also need to be connected to a terminal resistor to decrease signal interference.

FIG. 1 shows a block diagram of the network connection of the RS485 (or controller area network) of prior art. An electronic apparatus 102 includes a communication integrated circuit 104. The communication integrated circuit 104 includes a high electric potential side 106 and a low electric potential side 108 to communicate with other electronic apparatus 102. These high electric potential sides 106 are electrically connected. These low electric potential sides 108 are electrically connected. The first of the electronic apparatus 102 will need to be connected to a terminal resistor 110 to decrease signal interference, and the last of the electronic apparatus 102 will also need to be connected to a terminal resistor 110 to decrease signal interference.

In the prior art, the users install the terminal resistors 110 manually in the first of the electronic apparatus 102 and in the last of the electronic apparatus 102 after the users find out the first of the electronic apparatus 102 and the last of the electronic apparatus 102. It is very inconvenient and easy to make mistakes.

SUMMARY OF THE INVENTION

In order to solve the above-mentioned problems, an object of the present invention is to provide a terminal resistor apparatus.

In order to solve the above-mentioned problems, another object of the present invention is to provide a terminal resistor apparatus.

In order to achieve the object of the present invention mentioned above, the terminal resistor apparatus of the present invention is applied to a driving voltage and an electronic apparatus. The electronic apparatus includes a communication integrated circuit. The communication integrated circuit includes a high electric potential side and a low electric potential side. The terminal resistor apparatus includes an input-side switch, an input-side terminal resistor, an input-side driving circuit, an input-side short-circuit unit, an output-side switch, an output-side terminal resistor, an output-side driving circuit, and an output-side short-circuit unit. The input-side switch includes a first pin, a second pin, and a third pin. The input-side driving circuit includes an input-side first resistor. The output-side switch includes a first pin, a second pin, and a third pin. The output-side driving circuit includes an output-side first resistor. The third pin of the input-side switch is electrically connected to the low electric potential side. One side of the input-side terminal resistor is electrically connected to the high electric potential side. The other side of the input-side terminal resistor is electrically connected to the first pin of the input-side switch. The input-side driving circuit is electrically connected to the driving voltage and the second pin of the input-side switch. One side of the input-side first resistor is electrically connected to the driving voltage. The other side of the input-side first resistor is electrically connected to the second pin of the input-side switch. The input-side short-circuit unit is arranged corresponding to the input-side driving circuit. The third pin of the output-side switch is electrically connected to the low electric potential side. One side of the output-side terminal resistor is electrically connected to the high electric potential side. The other side of the output-side terminal resistor is electrically connected to the first pin of the output-side switch. The output-side driving circuit is electrically connected to the driving voltage and the second pin of the output-side switch. One side of the output-side first resistor is electrically connected to the driving voltage. The other side of the output-side first resistor is electrically connected to the second pin of the output-side switch. The output-side short-circuit unit is arranged corresponding to the output-side driving circuit. The input-side switch of the first terminal resistor apparatus will be conducted so that the input-side terminal resistor of the first terminal resistor apparatus will be connected between the high electric potential side and the low electric potential side when two of the terminal resistor apparatus are electrically connected. The second pin of the output-side switch of the first terminal resistor apparatus will be connected to ground because of the input-side short-circuit unit of the second terminal resistor apparatus, so that the output-side switch of the first terminal resistor apparatus will not be conducted. Therefore, the output-side terminal resistor of the first terminal resistor apparatus will not be connected between the high electric potential side and the low electric potential side. The second pin of the input-side switch of the second terminal resistor apparatus will be connected to ground because of the output-side short-circuit unit of the first terminal resistor apparatus, so that the input-side switch of the second terminal resistor apparatus will not be conducted. Therefore, the input-side terminal resistor of the second terminal resistor apparatus will not be connected between the high electric potential side and the low electric potential side. The output-side switch of the second terminal resistor apparatus will be conducted so that the output-side terminal resistor of the second terminal resistor apparatus will be connected between the high electric potential side and the low electric potential side.

In order to achieve the other object of the present invention mentioned above, the terminal resistor apparatus of the present invention is applied to a driving voltage and an electronic apparatus. The electronic apparatus includes a communication integrated circuit. The communication integrated circuit includes a high electric potential side and a low electric potential side. The terminal resistor apparatus includes an input-side switch, an input-side terminal resistor, an input-side driving circuit, an input-side first pin, an input-side second pin, an input-side third pin, an input-side fourth pin, an input-side fifth pin, and an input-side sixth pin. The terminal resistor apparatus further includes an output-side switch, an output-side terminal resistor, an output-side driving circuit, an output-side first pin, an output-side second pin, an output-side third pin, an output-side fourth pin, an output-side fifth pin, and an output-side sixth pin. The input-side switch includes a first pin, a second pin, and a third pin. The input-side driving circuit includes an input-side first resistor. The output-side switch includes a first pin, a second pin, and a third pin. The output-side driving circuit includes an output-side first resistor. The third pin of the input-side switch is electrically connected to the low electric potential side. One side of the input-side terminal resistor is electrically connected to the high electric potential side. The other side of the input-side terminal resistor is electrically connected to the first pin of the input-side switch. The input-side driving circuit is electrically connected to the driving voltage and the second pin of the input-side switch. One side of the input-side first resistor is electrically connected to the driving voltage. The other side of the input-side first resistor is electrically connected to the second pin of the input-side switch. The input-side first pin is electrically connected to the high electric potential side. The input-side second pin is electrically connected to the low electric potential side. The input-side third pin is arranged corresponding to the input-side second pin. The input-side fourth pin is electrically connected to the input-side third pin. The input-side fifth pin is electrically connected to the second pin of the input-side switch. The input-side sixth pin is electrically connected to ground. The third pin of the output-side switch is electrically connected to the low electric potential side. One side of the output-side terminal resistor is electrically connected to the high electric potential side. The other side of the output-side terminal resistor is electrically connected to the first pin of the output-side switch. The output-side driving circuit is electrically connected to the driving voltage and the second pin of the output-side switch. One side of the output-side first resistor is electrically connected to the driving voltage. The other side of the output-side first resistor is electrically connected to the second pin of the output-side switch. The output-side first pin is electrically connected to the high electric potential side. The output-side second pin is electrically connected to the low electric potential side. The output-side third pin is electrically connected to the second pin of the output-side switch. The output-side fourth pin is electrically connected to ground. The output-side fifth pin is arranged corresponding to the output-side fourth pin. The output-side sixth pin is electrically connected to the output-side fifth pin.

The efficiency of the present invention is to arrange the terminal resistors conveniently and correctly.

DETAILED DESCRIPTION OF THE INVENTION

Figure 1:
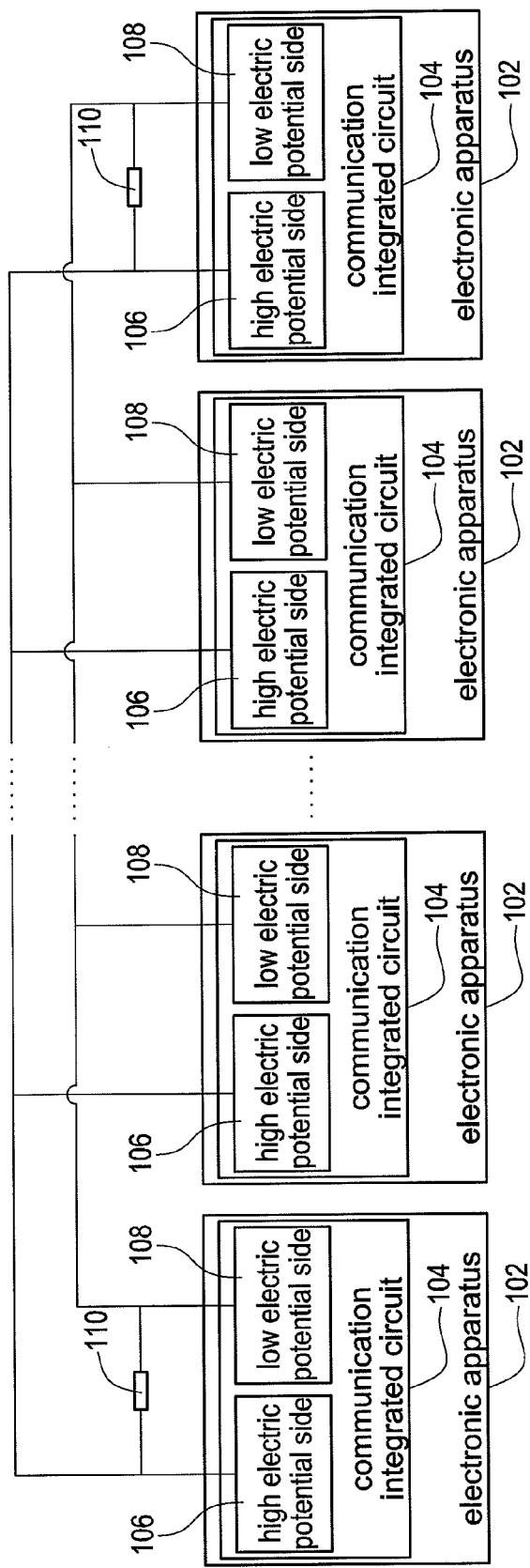
FIG. 1 shows a block diagram of the network connection of the RS485 (or controller area network) of prior art.
Figure 2:
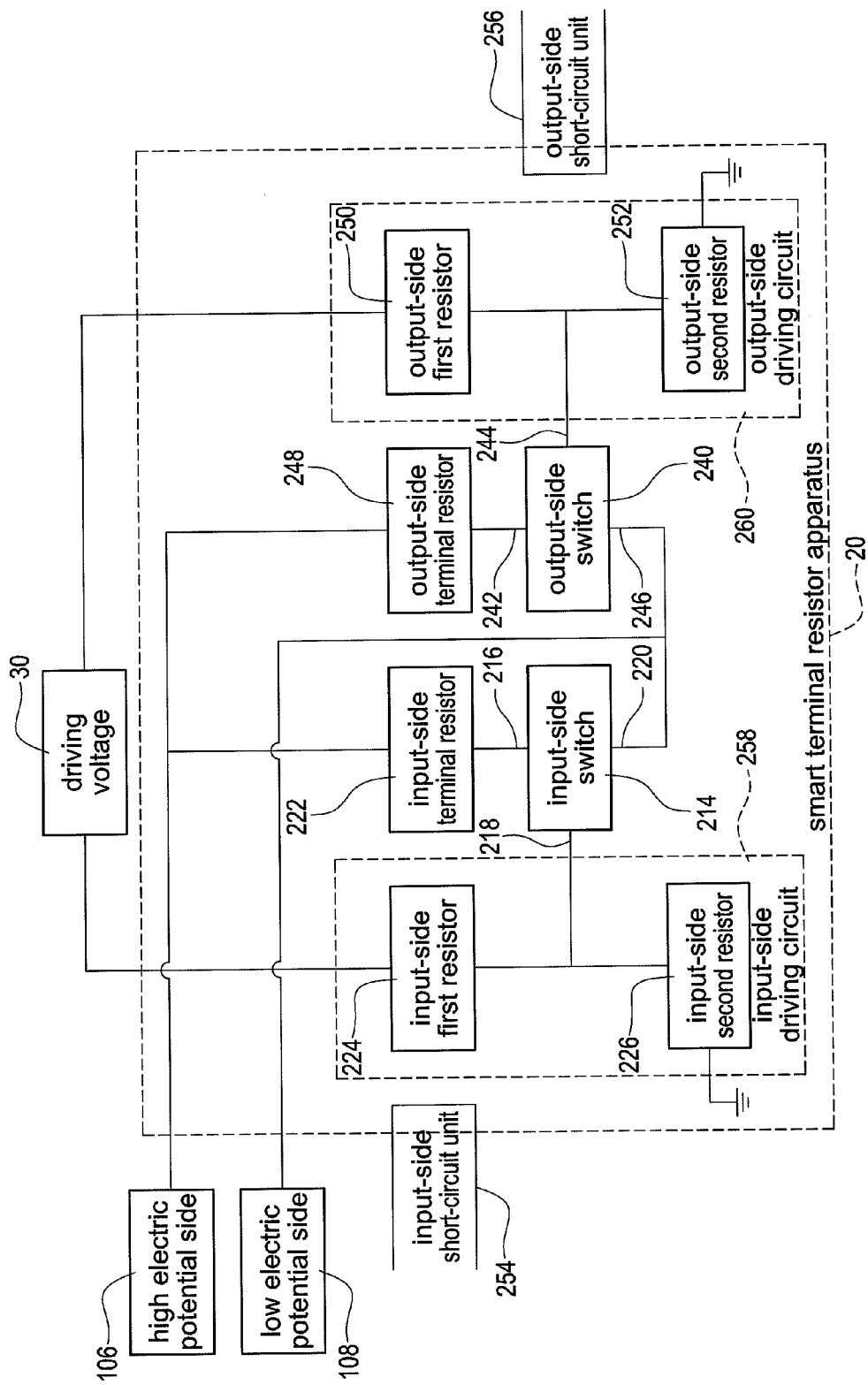
FIG. 2 shows a block diagram of an embodiment of terminal resistor apparatus of the present invention.

FIG. 2 shows a block diagram of an embodiment of terminal resistor apparatus of the present invention. The terminal resistor apparatus 20 of the present invention is applied to a driving voltage 30 and an electronic apparatus (not shown in the FIG. 2). The electronic apparatus includes a communication integrated circuit (not shown in the FIG. 2). The communication integrated circuit includes a high electric potential side 106 and a low electric potential side 108 to communicate with other electronic apparatus with RS485 or controller area network.

The terminal resistor apparatus 20 includes an input-side switch 214, an input-side terminal resistor 222, an input-side driving circuit 258, an input-side short-circuit unit 254, an output-side switch 240, an output-side terminal resistor 248, an output-side driving circuit 260, and an output-side short-circuit unit 256.

The input-side switch 214 includes a first pin 216, a second pin 218, and a third pin 220. The output-side switch 240 includes a first pin 242, a second pin 244, and a third pin 246.

The input-side driving circuit 258 includes an input-side first resistor 224 and an input-side second resistor 226. The output-side driving circuit 260 includes an output-side first resistor 250 and an output-side second resistor 252.

The third pin 220 of the input-side switch 214 is electrically connected to the low electric potential side 108. One side of the input-side terminal resistor 222 is electrically connected to the high electric potential side 106. The other side of the input-side terminal resistor 222 is electrically connected to the first pin 216 of the input-side switch 214.

The input-side driving circuit 258 is electrically connected to the driving voltage 30 and the second pin 218 of the input-side switch 214. One side of the input-side first resistor 224 is electrically connected to the driving voltage 30. The other side of the input-side first resistor 224 is electrically connected to the second pin 218 of the input-side switch 214. One side of the input-side second resistor 226 is electrically connected to the second pin 218 of the input-side switch 214. The other side of the input-side second resistor 226 is electrically connected to ground. The input-side short-circuit unit 254 is arranged corresponding to the input-side driving circuit 258.

The third pin 246 of the output-side switch 240 is electrically connected to the low electric potential side 108. One side of the output-side terminal resistor 248 is electrically connected to the high electric potential side 106. The other side of the output-side terminal resistor 248 is electrically connected to the first pin 242 of the output-side switch 240.

The output-side driving circuit 260 is electrically connected to the driving voltage 30 and the second pin 244 of the output-side switch 240. One side of the output-side first resistor 250 is electrically connected to the driving voltage 30. The other side of the output-side first resistor 250 is electrically connected to the second pin 244 of the output-side switch 240. One side of the output-side second resistor 252 is electrically connected to the second pin 244 of the output-side switch 240. The other side of the output-side second resistor 252 is electrically connected to ground. The output-side short-circuit unit 256 is arranged corresponding to the output-side driving circuit 260.

The input-side switch 214 could be a transistor or a field effect transistor. The output-side switch 240 could be a transistor or a field effect transistor. The input-side terminal resistor 222, the output-side terminal resistor 248, the input-side first resistor 224, the output-side first resistor 250, the input-side second resistor 226, and the output-side second resistor 252 are resistors.

Figure 3:
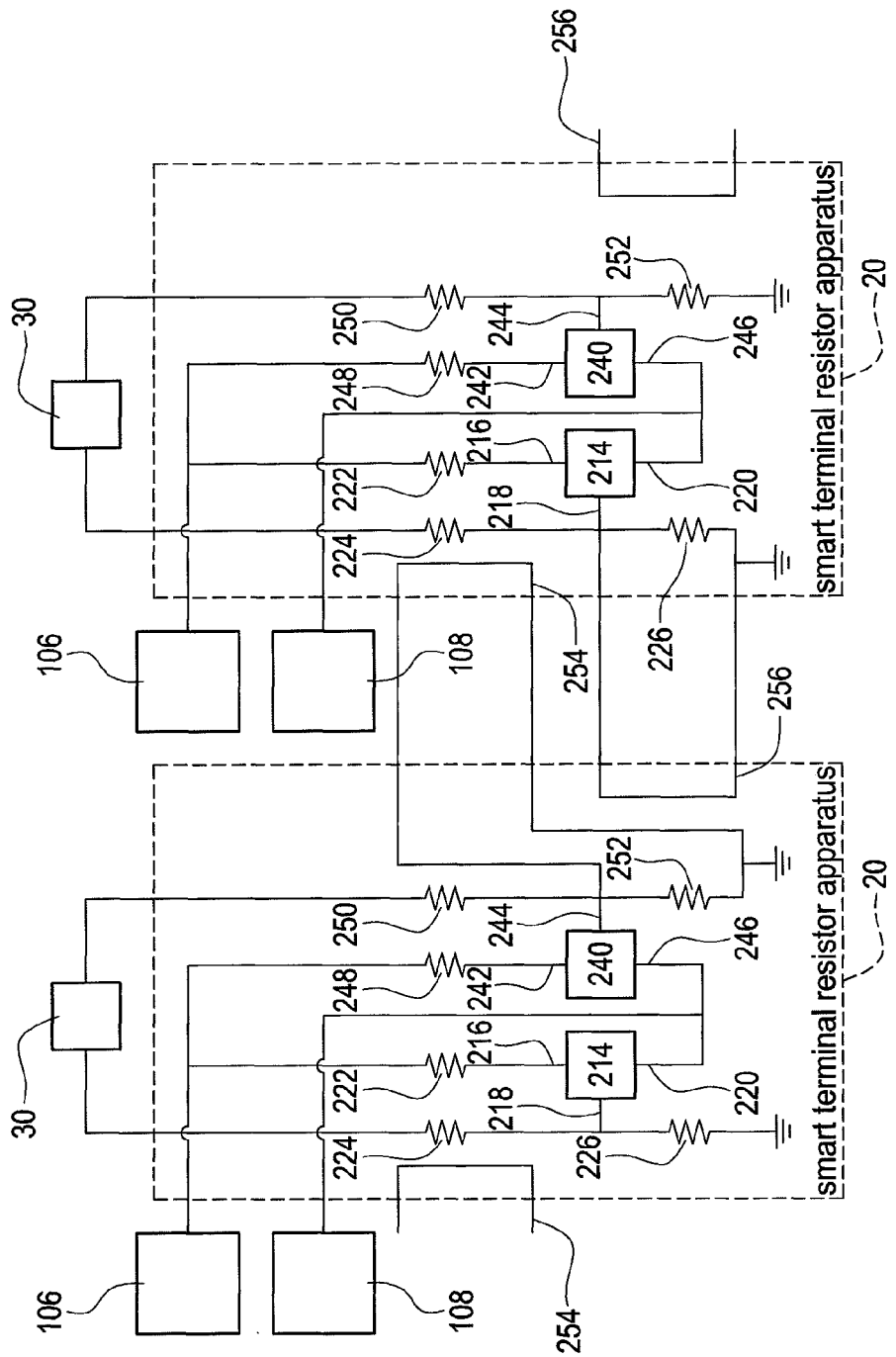
FIG. 3 shows a block diagram of the application of an embodiment of terminal resistor apparatus of the present invention.

FIG. 3 shows a block diagram of the application of an embodiment of terminal resistor apparatus of the present invention. When two of the terminal resistor apparatus 20 are electrically connected:

The input-side switch 214 of the first terminal resistor apparatus 20 will be conducted so that the input-side terminal resistor 222 of the first terminal resistor apparatus 20 will be connected between the high electric potential side 106 and the low electric potential side 108.

The second pin 244 of the output-side switch 240 of the first terminal resistor apparatus 20 will be connected to ground because of the input-side short-circuit unit 254 of the second terminal resistor apparatus 20, so that the output-side switch 240 of the first terminal resistor apparatus 20 will not be conducted. Therefore, the output-side terminal resistor 248 of the first terminal resistor apparatus 20 will not be connected between the high electric potential side 106 and the low electric potential side 108.

The second pin 218 of the input-side switch 214 of the second terminal resistor apparatus 20 will be connected to ground because of the output-side short-circuit unit 256 of the first terminal resistor apparatus 20, so that the input-side switch 214 of the second terminal resistor apparatus 20 will not be conducted. Therefore, the input-side terminal resistor 222 of the second terminal resistor apparatus 20 will not be connected between the high electric potential side 106 and the low electric potential side 108.

The output-side switch 240 of the second terminal resistor apparatus 20 will be conducted so that the output-side terminal resistor 248 of the second terminal resistor apparatus 20 will be connected between the high electric potential side 106 and the low electric potential side 108.

Figure 4:
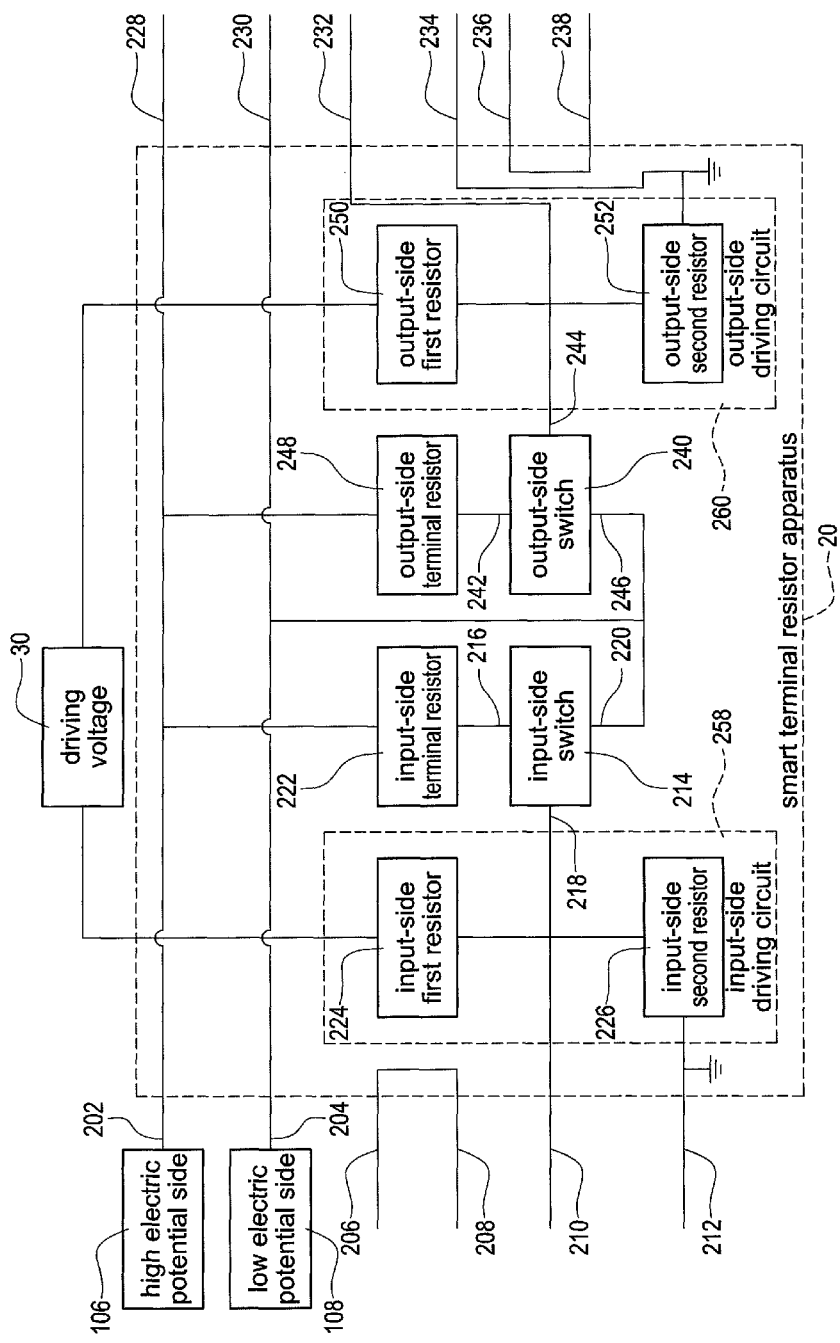
FIG. 4 shows a block diagram of another embodiment of terminal resistor apparatus of the present invention.

FIG. 4 shows a block diagram of another embodiment of terminal resistor apparatus of the present invention. The terminal resistor apparatus 20 of the present invention is applied to a driving voltage 30 and an electronic apparatus (not shown in the FIG. 4). The electronic apparatus includes a communication integrated circuit (not shown in the FIG. 4). The communication integrated circuit includes a high electric potential side 106 and a low electric potential side 108 to communicate with other electronic apparatus with RS485 or controller area network.

The terminal resistor apparatus 20 includes an input-side switch 214, an input-side terminal resistor 222, an input-side driving circuit 258, an input-side first pin 202, an input-side second pin 204, an input-side third pin 206, an input-side fourth pin 208, an input-side fifth pin 210, and an input-side sixth pin 212.

The terminal resistor apparatus 20 further includes an output-side switch 240, an output-side terminal resistor 248, an output-side driving circuit 260, an output-side first pin 228, an output-side second pin 230, an output-side third pin 232, an output-side fourth pin 234, an output-side fifth pin 236, and an output-side sixth pin 238.

The input-side switch 214 includes a first pin 216, a second pin 218, and a third pin 220. The output-side switch 240 includes a first pin 242, a second pin 244, and a third pin 246.

The input-side driving circuit 258 includes an input-side first resistor 224 and an input-side second resistor 226. The output-side driving circuit 260 includes an output-side first resistor 250 and an output-side second resistor 252. The third pin 220 of the input-side switch 214 is electrically connected to the low electric potential side 108. One side of the input-side terminal resistor 222 is electrically connected to the high electric potential side 106. The other side of the input-side terminal resistor 222 is electrically connected to the first pin 216 of the input-side switch 214.

The input-side driving circuit 258 is electrically connected to the driving voltage 30 and the second pin 218 of the input-side switch 214. One side of the input-side first resistor 224 is electrically connected to the driving voltage 30. The other side of the input-side first resistor 224 is electrically connected to the second pin 218 of the input-side switch 214. One side of the input-side second resistor 226 is electrically connected to the second pin 218 of the input-side switch 214. The other side of the input-side second resistor 226 is electrically connected to ground.

The input-side first pin 202 is electrically connected to the high electric potential side 106. The input-side second pin 204 is electrically connected to the low electric potential side 108. The input-side third pin 206 is arranged corresponding to the input-side second pin 204. The input-side fourth pin 208 is electrically connected to the input-side third pin 206. The input-side fifth pin 210 is electrically connected to the second pin 218 of the input-side switch 214. The input-side sixth pin 212 is electrically connected to ground.

The third pin 246 of the output-side switch 240 is electrically connected to the low electric potential side 108. One side of the output-side terminal resistor 248 is electrically connected to the high electric potential side 106. The other side of the output-side terminal resistor 248 is electrically connected to the first pin 242 of the output-side switch 240.

The output-side driving circuit 260 is electrically connected to the driving voltage 30 and the second pin 244 of the output-side switch 240. One side of the output-side first resistor 250 is electrically connected to the driving voltage 30. The other side of the output-side first resistor 250 is electrically connected to the second pin 244 of the output-side switch 240. One side of the output-side second resistor 252 is electrically connected to the second pin 244 of the output-side switch 240. The other side of the output-side second resistor 252 is electrically connected to ground.

The output-side first pin 228 is electrically connected to the high electric potential side 106. The output-side second pin 230 is electrically connected to the low electric potential side 108. The output-side third pin 232 is electrically connected to the second pin 244 of the output-side switch 240. The output-side fourth pin 234 is electrically connected to ground. The output-side fifth pin 236 is arranged corresponding to the output-side fourth pin 234. The output-side sixth pin 238 is electrically connected to the output-side fifth pin 236.

The input-side switch 214 could be a transistor or a field effect transistor. The output-side switch 240 could be a transistor or a field effect transistor. The input-side terminal resistor 222, the output-side terminal resistor 248, the input-side first resistor 224, the output-side first resistor 250, the input-side second resistor 226, and the output-side second resistor 252 are resistors.

Figure 5:
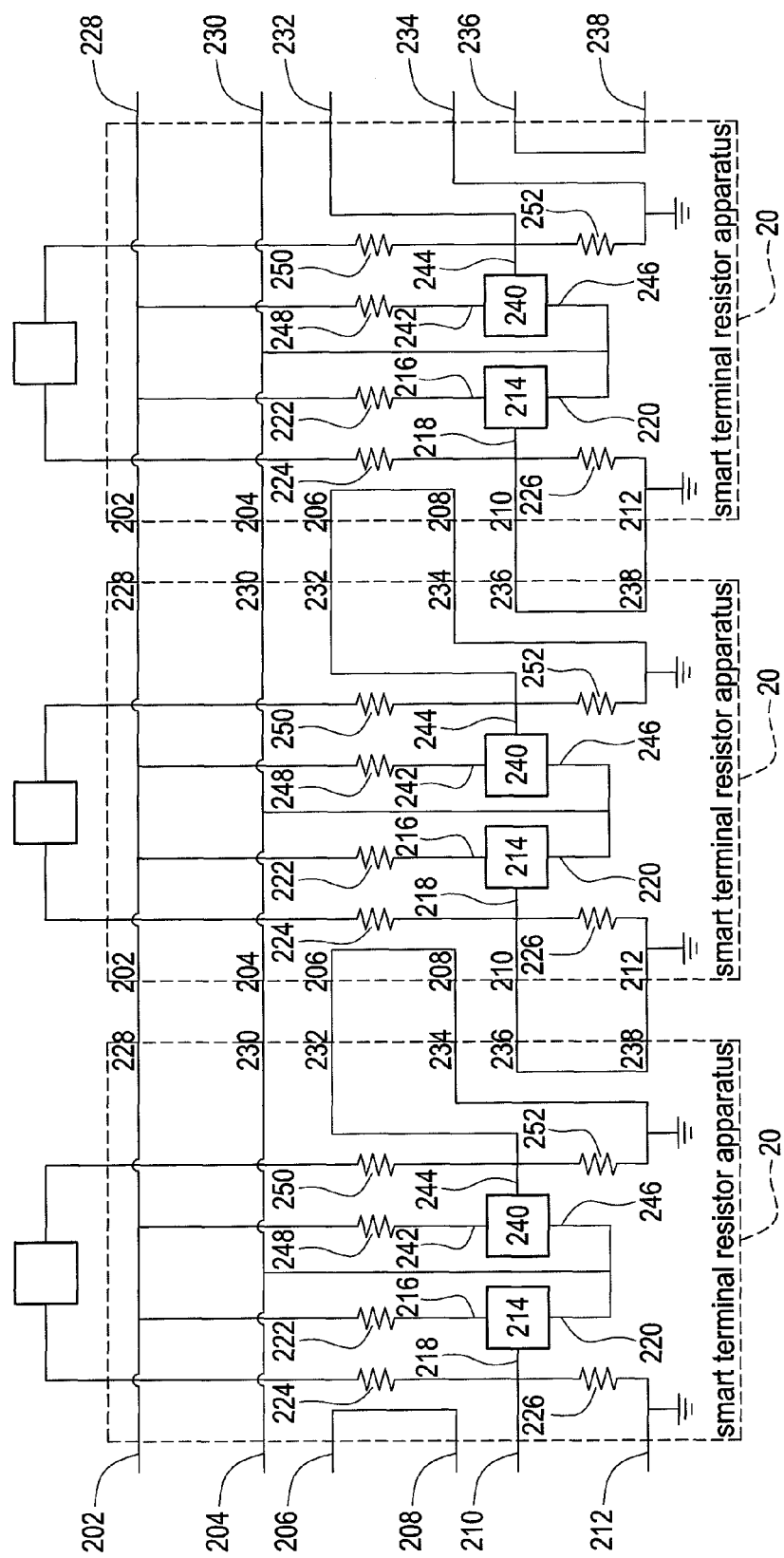
FIG. 5 shows a block diagram of the application of another embodiment of terminal resistor apparatus of the present invention.

FIG. 5 shows a block diagram of the application of another embodiment of terminal resistor apparatus of the present invention. We assume that three of the electronic apparatus need to be connected for communication. From the output-side first pin 228 to the output-side sixth pin 238 of the first terminal resistor apparatus 20 viewed from left to right direction are in sequence electrically connected to the input-side first pin 202 to the input-side sixth pin 212 of the second terminal resistor apparatus 20 viewed from left to right direction. From the output-side first pin 228 to the output-side sixth pin 238 of the second terminal resistor apparatus 20 viewed from left to right direction are in sequence electrically connected to the input-side first pin 202 to the input-side sixth pin 212 of the third terminal resistor apparatus 20 viewed from left to right direction.

The input-side switch 214 of the first terminal resistor apparatus 20 viewed from left to right direction is conducted, so that the input-side terminal resistor 222 will be connected between the input-side first pin 202 and the input-side second pin 204. The output-side switch 240 of the first terminal resistor apparatus 20 viewed from left to right direction is not conducted because the second pin 244 of the output-side switch 240 is connected to ground, so that the output-side terminal resistor 248 will not be connected between the output-side first pin 228 and the output-side second pin 230. That means the first electronic apparatus will have a terminal resistor.

The input-side switch 214 of the second terminal resistor apparatus 20 viewed from left to right direction is not conducted because the second pin 218 of the input-side switch 214 is connected to ground, so that the input-side terminal resistor 222 will not be connected between the input-side first pin 202 and the input-side second pin 204. The output-side switch 240 of the second terminal resistor apparatus 20 viewed from left to right direction is not conducted because the second pin 244 of the output-side switch 240 is connected to ground, so that the output-side terminal resistor 248 will not be connected between the output-side first pin 228 and the output-side second pin 230. That means the middle of the electronic apparatus will not have a terminal resistor.

The input-side switch 214 of the third terminal resistor apparatus 20 viewed from left to right direction is not conducted because the second pin 218 of the input-side switch 214 is connected to ground, so that the input-side terminal resistor 222 will not be connected between the input-side first pin 202 and the input-side second pin 204. The output-side switch 240 of the third terminal resistor apparatus 20 viewed from left to right direction is conducted so that the output-side terminal resistor 248 will be connected between the output-side first pin 228 and the output-side second pin 230. That means the last electronic apparatus will have a terminal resistor.

In a specific embodiment, from the input-side first pin 202 to the input-side sixth pin 212 could be implemented with an RJ45 female connector (RJ45 has eight pins, so two of the pins will not be used). From the output-side first pin 228 to the output-side sixth pin 238 could be implemented with an RJ45 female connector as well. Therefore the electrical connection of the terminal resistor apparatus 20 could be implemented with RJ45 network wires.

Figure 6:
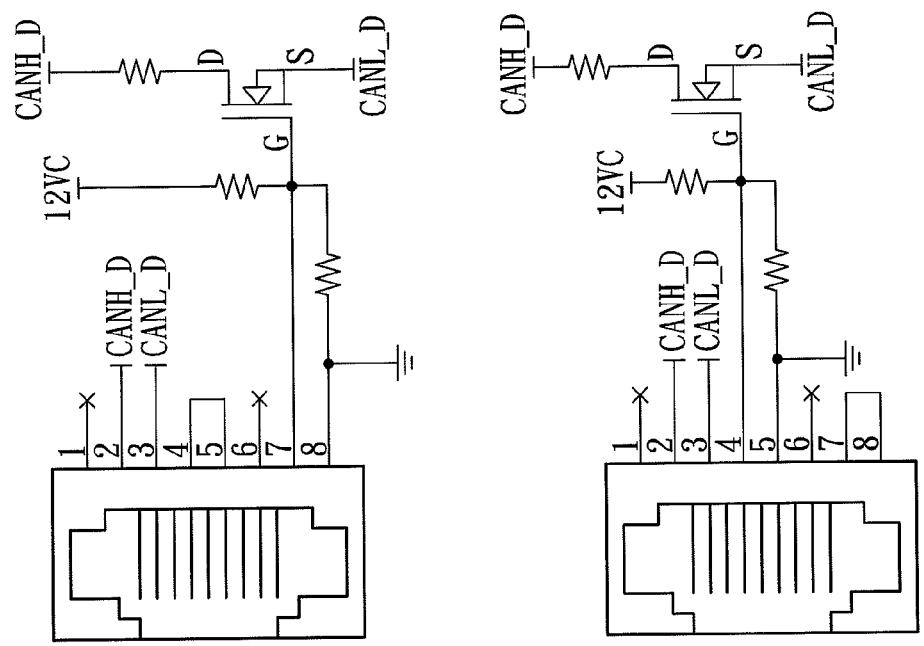
FIG. 6 shows a circuit diagram of an embodiment of terminal resistor apparatus of the present invention.

FIG. 6 shows a circuit diagram of an embodiment of terminal resistor apparatus of the present invention. From the input-side first pin 202 to the input-side sixth pin 212 are implemented with an RJ45 female connector in the embodiment (the first pin and the sixth pin of the RJ45 female connector are not used). From the output-side first pin 228 to the output-side sixth pin 238 are implemented with an RJ45 female connector in the embodiment (the first pin and the sixth pin of the RJ45 female connector are not used).

The advantage of the terminal resistor apparatus of the present invention is that the first electronic apparatus will be automatically connected to a terminal resistor and the last electronic apparatus will be automatically connected to a terminal resistor after a plurality of the electronic apparatus are connected, but the other electronic apparatus will not be connected to a terminal resistor, so that the signal interference will be decreased correctly. Unlike the prior art that the users have to install the terminal resistors manually in the first of the electronic apparatus and in the last of the electronic apparatus after the users find out the first of the electronic apparatus and the last of the electronic apparatus.

Although the present invention has been described with reference to the preferred embodiment thereof, it will be understood that the invention is not limited to the details thereof.

Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A terminal resistor apparatus applied to a driving voltage and an electronic apparatus, the electronic apparatus including a communication integrated circuit, the communication integrated circuit including a high electric potential side and a low electric potential side, the terminal resistor apparatus including:
   an input-side switch including a first pin, a second pin, and a third pin, the third pin being electrically connected to the low electric potential side;
   an input-side terminal resistor, one side of the input-side terminal resistor being electrically connected to the high electric potential side, the other side of the input-side terminal resistor being electrically connected to the first pin of the input-side switch;
   an input-side driving circuit electrically connected to the driving voltage and the second pin of the input-side switch, the input-side driving circuit including an input-side first resistor, one side of the input-side first resistor being electrically connected to the driving voltage, the other side of the input-side first resistor being electrically connected to the second pin of the input-side switch;
   an input-side short-circuit unit arranged corresponding to the input-side driving circuit;
   an output-side switch including a first pin, a second pin, and a third pin, the third pin being electrically connected to the low electric potential side;
   an output-side terminal resistor, one side of the output-side terminal resistor being electrically connected to the high electric potential side, the other side of the output-side terminal resistor being electrically connected to the first pin of the output-side switch;
   an output-side driving circuit electrically connected to the driving voltage and the second pin of the output-side switch, the output-side driving circuit including an output-side first resistor, one side of the output-side first resistor being electrically connected to the driving voltage, the other side of the output-side first resistor being electrically connected to the second pin of the output-side switch; and
   an output-side short-circuit unit arranged corresponding to the output-side driving circuit.

2. The terminal resistor apparatus in claim 1, wherein the input-side switch of the first terminal resistor apparatus is closed and then the input-side terminal resistor of the first terminal resistor apparatus is connected to the high electric potential side and the low electric potential side when two of the terminal resistor apparatus are electrically connected.

3. The terminal resistor apparatus in claim 2, wherein the input-side short-circuit unit of the second terminal resistor apparatus makes the second pin of the output-side switch of the first terminal resistor apparatus connected to ground, and then the output-side switch of the first terminal resistor apparatus is not conducted; therefore, the output-side terminal resistor of the first terminal resistor apparatus is not connected to the high electric potential side and the low electric potential side.

4. The terminal resistor apparatus in claim 3, wherein the output-side short-circuit unit of the first terminal resistor apparatus makes the second pin of the input-side switch of the second terminal resistor apparatus connected to ground, and then the input-side switch of the second terminal resistor apparatus is not conducted; therefore, the input-side terminal resistor of the second terminal resistor apparatus is not connected to the high electric potential side and the low electric potential side.

5. The terminal resistor apparatus in claim 4, wherein the output-side switch of the second terminal resistor apparatus is closed, and then the output-side terminal resistor of the second terminal resistor apparatus is connected to the high electric potential side and the low electric potential side.

6. The terminal resistor apparatus in claim 5, wherein the input-side driving circuit further includes an input-side second resistor, wherein one side of the input-side second resistor is electrically connected to the second pin of the input-side switch, and the other side of the input-side second resistor is electrically connected to ground.

7. The terminal resistor apparatus in claim 6, wherein the output-side driving circuit further includes an output-side second resistor, wherein one side of the output-side second resistor is electrically connected to the second pin of the output-side switch and the other side of the output-side second resistor is electrically connected to ground.

8. The terminal resistor apparatus in claim 7, wherein the input-side switch is a transistor or a field effect transistor; and the output-side switch is a transistor or a field effect transistor.

9. A terminal resistor apparatus applied to a driving voltage and an electronic apparatus, the electronic apparatus including a communication integrated circuit, the communication integrated circuit including a high electric potential side and a low electric potential side, the terminal resistor apparatus including:
   an input-side switch including a first pin, a second pin, and a third pin, the third pin being electrically connected to the low electric potential side;
   an input-side terminal resistor, one side of the input-side terminal resistor being electrically connected to the high electric potential side, the other side of the input-side terminal resistor being electrically connected to the first pin of the input-side switch;
   an input-side driving circuit electrically connected to the driving voltage and the second pin of the input-side switch, the input-side driving circuit including an input-side first resistor, one side of the input-side first resistor being electrically connected to the driving voltage, the other side of the input-side first resistor being electrically connected to the second pin of the input-side switch;
   an input-side first pin electrically connected to the high electric potential side;
   an input-side second pin electrically connected to the low electric potential side;
   an input-side third pin arranged corresponding to the input-side second pin;
   an input-side fourth pin electrically connected to the input-side third pin;
   an input-side fifth pin electrically connected to the second pin of the input-side switch;
   an input-side sixth pin electrically connected to ground;
   an output-side switch including a first pin, a second pin, and a third pin, the third pin being electrically connected to the low electric potential side;
   an output-side terminal resistor, one side of the output-side terminal resistor being electrically connected to the high electric potential side, the other side of the output-side terminal resistor being electrically connected to the first pin of the output-side switch;
   an output-side driving circuit electrically connected to the driving voltage and the second pin of the output-side switch, the output-side driving circuit including an output-side first resistor, one side of the output-side first resistor being electrically connected to the driving voltage, the other side of the output-side first resistor being electrically connected to the second pin of the output-side switch;
   an output-side first pin electrically connected to the high electric potential side;
   an output-side second pin electrically connected to the low electric potential side;
   an output-side third pin electrically connected to the second pin of the output-side switch;
   an output-side fourth pin electrically connected to ground;
   an output-side fifth pin arranged corresponding to the output-side fourth pin; and
   an output-side sixth pin electrically connected to the output-side fifth pin.

10. The terminal resistor apparatus in claim 9, wherein the input-side driving circuit further includes an input-side second resistor, wherein one side of the input-side second resistor is electrically connected to the second pin of the input-side switch, and the other side of the input-side second resistor is electrically connected to ground.

11. The terminal resistor apparatus in claim 10, wherein the output-side driving circuit further includes an output-side second resistor; one side of the output-side second resistor is electrically connected to the second pin of the output-side switch, and the other side of the output-side second resistor is electrically connected to ground.

12. The terminal resistor apparatus in claim 11, wherein the input-side switch is a transistor or a field effect transistor; the output-side switch is a transistor or a field effect transistor.

* * * * *